United States Patent
Kim et al.

(10) Patent No.: US 10,144,415 B2
(45) Date of Patent: Dec. 4, 2018

(54) LIMP HOME MODE DRIVE METHOD AND SYSTEM FOR HYBRID VEHICLE

(71) Applicants: Hyundai Motor Company, Seoul (KR); Kia Motors Corporation, Seoul (KR)

(72) Inventors: Gyeongcheol Kim, Gyeonggi-do (KR); Haksung Lee, Gyeonggi-do (KR); SangLok Song, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 177 days.

(21) Appl. No.: 15/259,090

(22) Filed: Sep. 8, 2016

(65) Prior Publication Data
US 2017/0282910 A1    Oct. 5, 2017

(30) Foreign Application Priority Data

Mar. 30, 2016 (KR) .................. 10-2016-0038487

(51) Int. Cl.
| | |
|---|---|
| B60W 20/50 | (2016.01) |
| B60W 10/06 | (2006.01) |
| B60W 10/08 | (2006.01) |
| B60W 10/10 | (2012.01) |
| B60W 10/30 | (2006.01) |

(Continued)

(52) U.S. Cl.
CPC ............ *B60W 20/50* (2013.01); *B60K 6/445* (2013.01); *B60W 10/06* (2013.01); *B60W 10/08* (2013.01); *B60W 10/10* (2013.01); *B60W 10/30* (2013.01); *B60W 30/1843* (2013.01); *B60W 50/14* (2013.01); *B60W 2510/107* (2013.01); *B60W 2710/083* (2013.01); *B60W 2710/1005* (2013.01); *B60W 2720/10* (2013.01); *B60Y 2200/92* (2013.01); *B60Y 2300/91* (2013.01); *B60Y 2306/13* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 2008/0240941 | A1* | 10/2008 | Kumazaki | F16F 1/0031 417/309 |
| 2017/0101907 | A1* | 4/2017 | Kang | F01M 1/02 |
| 2017/0268662 | A1* | 9/2017 | Song | F16H 61/0025 |

FOREIGN PATENT DOCUMENTS

| | | |
|---|---|---|
| JP | 3835007 B2 | 10/2006 |
| JP | 2007-203883 A | 8/2007 |

(Continued)

*Primary Examiner* — James M McPherson
(74) *Attorney, Agent, or Firm* — Mintz Levin Cohn Ferris Glovsky and Popeo, P.C.; Peter F. Corless

(57) ABSTRACT

A limp home mode drive method and system for a hybrid vehicle are provided. The method includes prohibiting an operation of an overdrive brake that is included in a transmission for the hybrid vehicle and is driven by an electric oil pump when the hybrid vehicle is being driven and the electric oil pump is not operated. A speed of the hybrid vehicle is then limited based on a heat value of a rotation driver included in the transmission and a torque of a drive motor driving the transmission is limited based on a temperature of the drive motor. A mechanical oil pump included in the hybrid vehicle is operated to enable limp home driving of the hybrid vehicle.

14 Claims, 6 Drawing Sheets

(51) Int. Cl.
 _B60W 50/14_ (2012.01)
 _B60K 6/445_ (2007.10)
 _B60W 30/184_ (2012.01)

(56) References Cited

FOREIGN PATENT DOCUMENTS

| | | |
|---|---|---|
| JP | 2013-119881 A | 6/2013 |
| KR | 10-2012-0063299 A | 6/2012 |

\* cited by examiner

LIMP HOME MODE DRIVE METHOD AND SYSTEM FOR HYBRID VEHICLE

CROSS-REFERENCE TO RELATED APPLICATION

This application claims priority to and the benefit of Korean Patent Application No. 10-2016-0038487 filed in the Korean Intellectual Property Office on Mar. 30, 2016, the entire contents of which are incorporated herein by reference.

BACKGROUND

(a) Field of the Invention

The present invention relates to a hybrid vehicle, and more particularly, to a limp home mode drive method and system for a hybrid vehicle that uses a mechanical oil pump (MOP).

(b) Description of the Related Art

A gasoline vehicle uses only a mechanical oil pump (MOP) that operates by being connected to an engine. A hybrid vehicle uses an electric oil pump (EOP) in an electric vehicle (EV) driving mode. The MOP is directly connected to an engine of the hybrid vehicle to be rotated and thus, the MOP suctions a working oil stored in an oil pan to discharge (or supply) the suctioned oil to a transmission. The discharged oil is capable of operating the transmission. The EOP is driven by a motor using a high voltage battery to operate a transmission.

The hybrid vehicle includes an oil pump unit having the EOP configured to supply working oil to drive the transmission, a pump controller configured to operate the EOP, and a relay that connects or disconnects a power supply for the EOP. The pump controller is configured to transmit and receive information between a transmission control unit (TCU) via controller area network (CAN) communication and electronically operate the EOP based on a control signal applied from the TCU. The TCU is a superordinate controller.

However, when a failure occurs causing the pump controller to not perform the CAN communication, a problem in the CAN communication between the TCU and the pump controller occurs, or a failure occurs in the relay, the control signal sent from the TCU cannot be received in the pump controller and an operation of the EOP cannot be executed, and thus the EOP cannot supply the working oil to the transmission.

The above information disclosed in this section is merely for enhancement of understanding of the background of the invention and therefore it may contain information that does not form the prior art that is already known in this country to a person of ordinary skill in the art.

SUMMARY

The present invention provides a limp home mode drive method and system for a hybrid vehicle such as a hybrid electric vehicle that uses a mechanical oil pump (MOP). The limp home mode drive method and system are capable of enabling limp home driving of the hybrid vehicle by restrictively driving the hybrid vehicle with the MOP when an electric oil pump (EOP) fails.

An exemplary embodiment of the present invention provides the limp home mode drive method for the hybrid vehicle that may include: prohibiting, by a controller, an operation of an overdrive brake included in a transmission for the hybrid vehicle and driven by an electric oil pump when the hybrid vehicle travels and the electric oil pump is not operated; limiting, by the controller, a speed of the hybrid vehicle based on a heat value of a rotation driver included in the transmission; limiting, by the controller, a torque of a drive motor driving the transmission based on a temperature of the drive motor; and driving, by the controller, a mechanical oil pump included in the hybrid vehicle to enable limp home driving of the hybrid vehicle.

The limp home mode drive method for the hybrid vehicle may further include: determining, by the controller, whether a torque required by a driver is greater than or equal to a torque of the drive motor. In response to determining that the torque required by the driver is greater than or equal to the torque of the drive motor, the controller may be configured to drive the mechanical oil pump operating the transmission driven by an engine and the drive motor to perform limp home driving of the hybrid vehicle after the engine that drives the transmission is turned on by the controller. The rotation driver may include a gear.

The limp home mode drive method may further include: determining, by the controller, whether the hybrid vehicle is being driven. In response to determining that the hybrid vehicle is not being driven, the controller may be configured to turn off the engine. The limp home mode drive method may further include: determining, by the controller, whether charge of a battery included in the hybrid vehicle is required after the engine is turned off. In response to determining that the charge of the battery is required, the controller may be configured to turn on a warning light.

When the heat value of the rotation driver is greater than a predetermined heat value, a speed of the hybrid vehicle may be low (e.g., less than a predetermined speed). When the temperature of the drive motor is high (e.g., greater than a predetermined temperature), the torque of the drive motor may be low (e.g., less than a predetermined torque). The limp home mode drive method for the hybrid vehicle according to the exemplary embodiment of the present invention, which is a fail-safe logic used when the electric oil pump (EOP) for driving a flexible hybrid system (FHS) type transmission is not operated, may use the mechanical pump oil (MOP) to enable (or perform) limp home driving. In particular, the exemplary embodiment of the present invention may be the fail-safe logic that enables limp home driving when the vehicle is not capable of being driven (e.g., when the EOP for operating the FHS transmission fails or when it is impossible to operate the EOP). Further, the exemplary embodiment of the present invention may improve driving efficiency of the FHS transmission.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
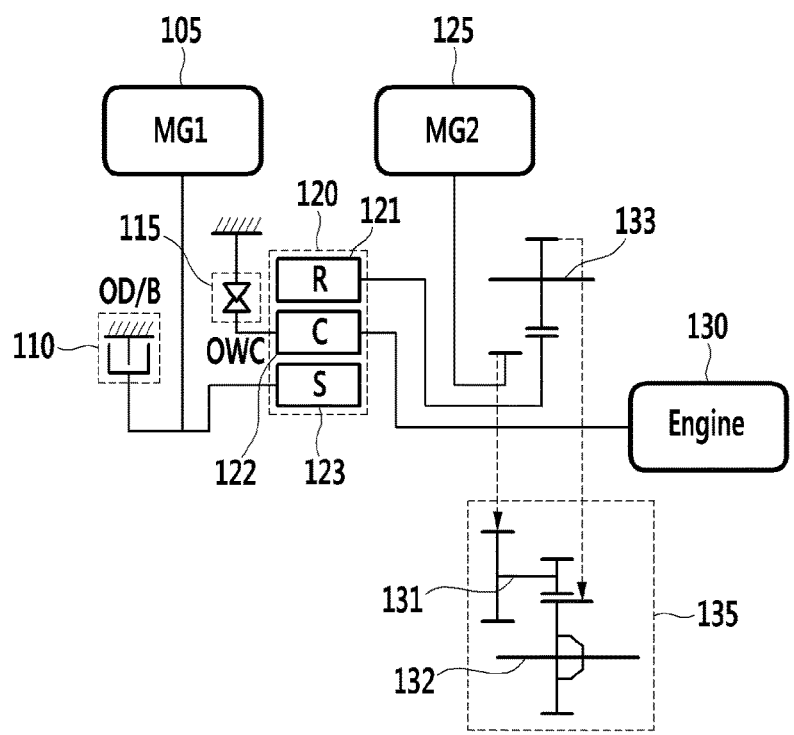
FIG. 1 is a view illustrating a flexible hybrid system (FHS) transmission according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe specific exemplary embodiments rather than limiting the present invention. Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A related art that uses a mechanical oil pump (MOP) to perform limp home driving based on a failure thus causing incapability of operating an electric oil pump (EOP) is described as follows. The related art limits torque and speed of a vehicle and always drives the MOP to perform a fail-safe control, thereby enabling the limp home driving of the vehicle. A configuration of a flexible hybrid system (FHS) type transmission is different from a configuration of a hybrid system (or a transmission of a hybrid vehicle) according to the related art, and a hydraulic circuit that operates the FHS transmission and includes the MOP and the EOP is different from a hydraulic circuit that operates the hybrid system and includes the MOP and the EOP. Thus, the related art cannot be applied to the FHS transmission. When the related art is applied to the FHS transmission, the FHS transmission is damaged since the related art that operates the MOP cannot be applied to the FHS transmission.

FIG. 1 is a view illustrating a flexible hybrid system (FHS) transmission according to an exemplary embodiment of the present invention. Referring to FIG. 1, the FHS transmission may be driven by two motors 105 and 125 and an engine 130 and may perform function of a continuously variable transmission (CVT).

In particular, the transmission may include a planetary gear set (or a planetary gear device) 120. A ring gear 121 of the planetary gear set 120 may be connected to an output shaft (or a main shaft) 132 of a power output unit 135 via a first countershaft 133. The output shaft 132 may be configured to deliver power to wheels (or driving wheels). The first countershaft 133 may be connected to the output shaft 132 via a gear. Additionally, the first counter shaft 133 may be included in the power output unit 135. A second countershaft 131 of the power output unit 135 may be connected to the output shaft 132 through a gear.

Further, a carrier 122 of the planetary gear set 120 may be connected to a one way clutch (OWC) 115 and the engine 130 such as an internal combustion engine. A sun gear 123 of the planetary gear set 120 may be connected to an overdrive brake (OD/B) 110. The OD/B 110 may also be referred to as an overdrive (OD) clutch, an OD brake clutch, or an OD clutch brake. The one way clutch (OWC) 115 and the OD/B 110 may be connected to a housing of the transmission. A first motor (or a first drive motor) 105 may be connected to the sun gear 123. A second motor (or a second drive motor) 125 may be connected to the second countershaft 131. The first motor 105 may also be operated as a generator to charge a high voltage battery of a hybrid vehicle including the FHS transmission. The high voltage battery may be configured to supply power (e.g., electric power) to the first motor 105 and the second motor 125.

The FHS transmission illustrated in FIG. 1 may be a transmission of a power split-parallel type hybrid vehicle. A power split operation mode of a hybrid electric vehicle (HEV) mode that is a driving mode of the hybrid vehicle may be a mode in which power of the engine 130 may be output via the power output unit 135 and the first motor 105 operates as a generator using the power of the engine. In the power split operation mode, the overdrive brake 110 may be in an open state and the OWC 115 may be in an open state (or a free state). When the first motor 105 operates as the generator, the high voltage battery included in the hybrid vehicle may be charged.

A parallel mode of the HEV mode may be a mode in which power of the engine 130 and power of the second motor 125 may be output via the power output unit 135. In the parallel mode, the overdrive brake 110 may be in a closed state and the OWC 115 may be in an open state (or a free state). A first electric vehicle (EV) mode of the driving mode of the hybrid vehicle may be a mode in which the power of the second motor 125 may be output via the power output unit 135. In the first electric vehicle (EV) mode, the overdrive brake 110 may be in an open state and the OWC 115 may be in an open state (or a free state). A second electric vehicle (EV) mode of the driving mode of the hybrid vehicle may be a mode in which power of the first motor 105 and power of the second motor 125 may be output via the power output unit 135. In the second electric vehicle (EV) mode, the overdrive brake 110 may be in an open state and the OWC 115 may be in a locked state.

Figure 2:
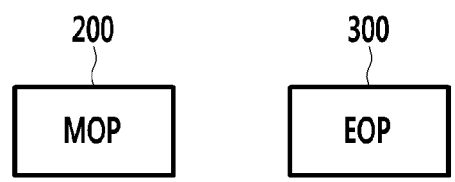
FIG. 2 is a view illustrating a mechanical oil pump (MOP) and an electric oil pump (EOP) for driving the FHS transmission illustrated in FIG. 1 according to an exemplary embodiment of the present invention.

FIG. 2 is a view illustrating a mechanical oil pump (MOP) and an electric oil pump (EOP) for driving the FHS transmission illustrated in FIG. 1. Referring to FIG. 2, the MOP 200 and the EOP 300 may be included in a hydraulic circuit. The MOP 200 may be configured to perform lubrication for the transmission and cooling of the motors 105 and 125 and the EOP 300 may assist the MOP 200 when there is lack of the lubrication and the cooling. When the lubrication for the transmission and the cooling of the motors 105 and 125 performed by the MOP 200 are insufficient due to a high driving load or when the MOP does not operate when the vehicle stops, an operation of the EOP 300 may be required. In other words, the EOP 300 may aid an operation of the MOP 200 in a high load operation of the vehicle. The EOP 300 may generate a control pressure of the OD brake 110 that operates in a high speed region of the vehicle and may be used for improving fuel efficiency of the vehicle.

Figure 3:
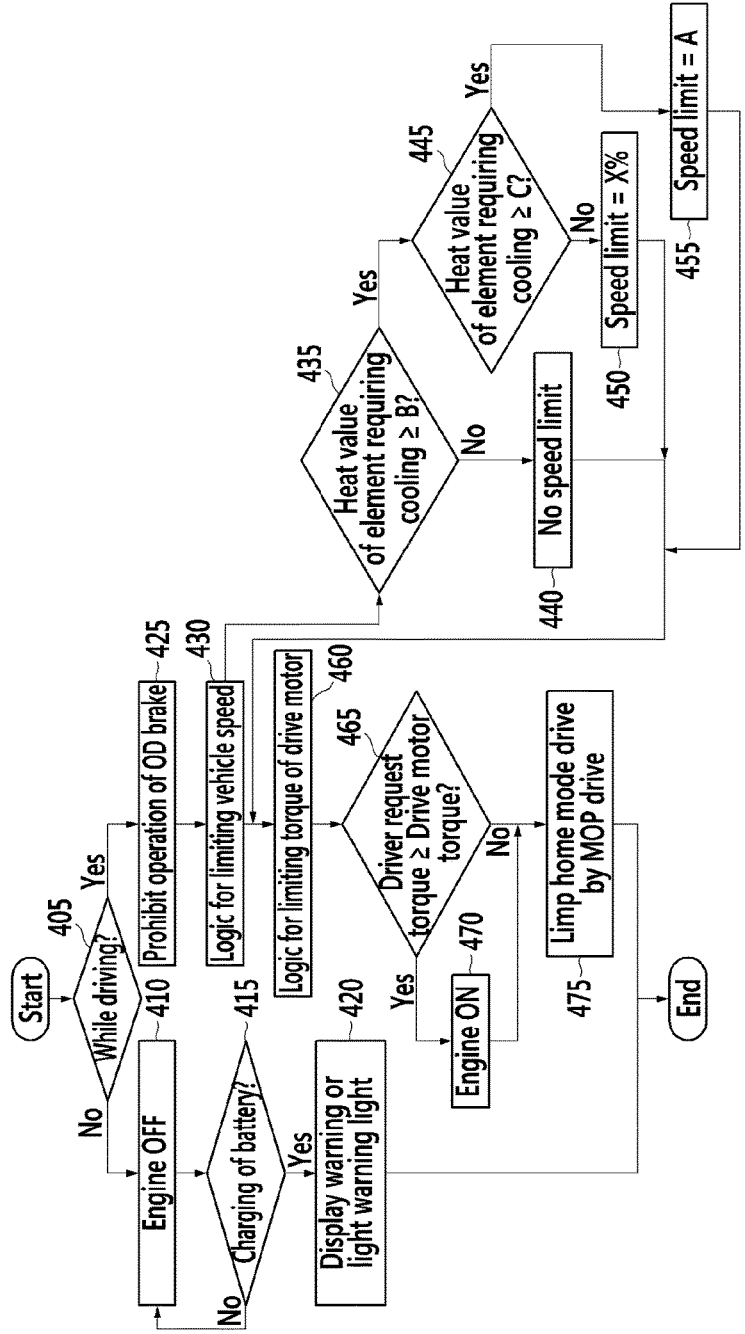
FIG. 3 is a flowchart describing a limp home mode drive method for the hybrid vehicle according to an exemplary embodiment of the present invention.

FIG. 3 is a flowchart describing a limp home mode drive method for the hybrid vehicle according to an exemplary embodiment of the present invention. The limp home mode drive method for the hybrid vehicle may be applied to the hybrid vehicle including the MOP 200 and the EOP 300 for driving the FHS transmission shown in FIG. 2. Referring to FIGS. 1-3, in a determination step 405, a controller may be configured to determine whether the hybrid vehicle having a failure which causes an impossibility of operating the EOP 300 is being driven. A speed of the hybrid vehicle may be greater than zero miles per hour while the hybrid vehicle is being driven. The failure which causes an impossibility of operating the EOP 300 may include a failure of the EOP, a failure of a control device for operating the EOP, or a failure that occurred when a power supply is not supplied to the EOP due to a relay failure or a wiring failure.

For example, the controller may be one or more microprocessors operated by a program or hardware including the microprocessor. The program may include a series of commands for executing the limp home mode drive method for the hybrid vehicle according to an exemplary embodiment of the present invention. The controller may be configured to execute an entire operation of the hybrid vehicle including the transmission and the hydraulic circuit.

In response to determining that the hybrid vehicle is not being driven (e.g., the vehicle speed is 0 miles per hour the limp home mode drive method may proceed to a turning-off step 410. In response to determining that the hybrid vehicle is being driven, the process may proceed to a prohibition step 425. According to the turning-off step 410, the controller may be configured to turn off the engine 130. The MOP 200 may be connected to an axle to operate in proportion to the vehicle speed, and thus the MOP may not operate when the vehicle is stopped. Accordingly, when the vehicle stops, the engine 130 should not be operated. When the engine 130 and the motor 105 or 125 operate when the vehicle stops, lubrication for the transmission may not be performed and thus, the transmission may be damaged.

According to a determination step 415, the controller may be configured to determine whether charge of a battery (e.g., a high voltage battery) mounted within the hybrid vehicle is required after the engine 130 is turned off. In response to determining that the charge of the battery of the hybrid vehicle is required, the process may proceed to a warning step 420. According to the warning step 420, the controller may be configured to output a warning indicating that the battery cannot be charged and the warning may be displayed on a display device of the hybrid vehicle. Alternatively, the controller may be configured to turn on a warning light to provide a driver with the warning regarding the battery charging capabilities.

Even when the vehicle stops, power of the battery may be continuously consumed by operating an air conditioner of the vehicle. When the charge of the battery is required, the engine 130 may be turned on. However, when the engine 130 is turned on, the transmission may be damaged since the MOP 200 and the EOP 300 are not operating. Therefore, as mentioned in the warning step 420, the warning may be displayed or the warning light may be turned on to provide the warning to a driver of the vehicle.

According to the prohibition step 425, the controller may be configured to prohibit or block an operation of the OD brake 110 included in the transmission and driven by the EOP 300. The EOP 300 may not provide a control pressure for an operation of the OD brake 110 to the OD brake when the EOP fails and the MOP 200 may not provide the control pressure for the operation of the OD brake, and thus the OD brake 110 should not be operated when the EOP fails. Since the OD brake 110 may be used for improving the fuel efficiency, there may be no problem in driving of the vehicle. According to a start step 430, the controller may start execution of a logic for limiting a speed of the hybrid vehicle after the prohibition step 425.

Figure 4:
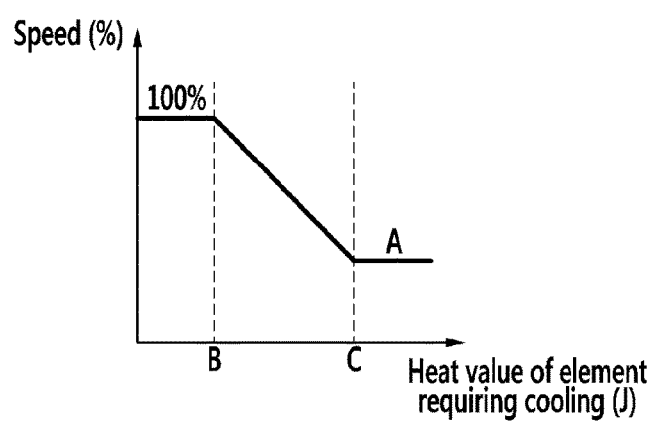
FIG. 4 is a graph describing a logic for limiting the vehicle speed shown in FIG. 3 according to an exemplary embodiment of the present invention.

FIG. 4 is a graph describing the logic for limiting the vehicle speed shown in FIG. 3. Referring to FIG. 4, when the EOP 300 fails while the hybrid vehicle is being driven, the MOP 200 may be configured to perform lubricating and cooling of an element (e.g., a rotation driver) of the transmission in which cooling is required. For example, the rotation driver may include a gear, a gear assembly, or a bearing which supports a gear shaft (a shaft connected to the gear). Since the element also performs a rapid rotation when the vehicle speed increases, a lubrication amount (or a lubrication flow amount) that the element requires and a cooling amount (or a cooling flow amount) that cools heat of the element may increase. The lubrication amount and the cooling amount may not be supplied only by the MOP, and thus the vehicle speed limit may be required.

In the graph of FIG. 4, a heat value of the element may be determined using the following equation:

The heat value of the element that cooling is required in=a rotation speed of the gear*[abs (delivery torque of the gear)*a loss rate constant of the gear+a drag constant of the bearing included in an gear transmission]

In the equation, the abs is a function used to obtain an absolute value.

In FIG. 4, A, which may be a minimum speed value that does not change based on a change of the heat value, may be, for example, 0% and may be selected by a test. In FIG. 4, B, C, and X % that is a value between a speed corresponding to the B and a speed corresponding to C may be selected by a test. A speed between the B and the C may have a linear slope or a non-linear slope. As shown in FIG. 4, the speed limit may exist when the heat value of the element (e.g., the gear assembly) that cooling is required in is high (e.g., greater than a predetermined heat value) and the speed limit may be removed when the heat value of the element is low (e.g., less than a predetermined heat value).

Referring back to FIG. 3, the logic for limiting the vehicle speed will be described in more detail below. According to a determination step 435, the controller may be configured to determine whether the heat value of the element that cooling is required in is greater than or equal to B that is a threshold value. In response to determining that the heat value of the element is less than B, the process may proceed to a step 440. Additionally, in response to determining that the heat value of the element is greater than or equal to B, the process may proceed to a determination step 445.

According to the determination step 445, the controller may be configured to determine whether the heat value of the element is greater than or equal to C that is a threshold value. In response to determining that the heat value of the element is less than C, the process may proceed to a limitation step 450. Additionally, in response to determining that the heat value of the element is greater than or equal to C, the process may proceed to a limitation step 455. According to the limitation step 450, the controller may be configured to drive the hybrid vehicle by limiting a speed of the vehicle to the X %. Further, according to the limitation step 455, the controller may be configured to drive the hybrid vehicle by limiting a speed of the vehicle to the A %. At step 460, the controller may be configured to perform a control logic (or a control method) for limiting a torque of the drive motor 105 or 125 of the hybrid vehicle after the logic for limiting the vehicle speed is performed.

Figure 5:
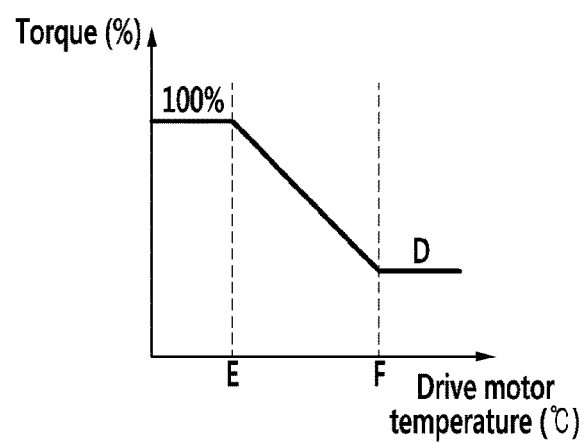
FIG. 5 is a graph describing a logic for limiting a torque of a drive motor shown in FIG. 3 according to an exemplary embodiment of the present invention.

FIG. 5 is a graph describing the logic for limiting a torque of the drive motor shown in FIG. 3. Referring to FIG. 5, when the EOP 300 fails while the hybrid vehicle is being driven, the MOP 200 may be configured to perform cooling of the drive motors 105 and 125. A substantial amount of heat may be generated in a high load region of the vehicle by the motor, and thus cooling of the motor may not be performed only by the MOP 200. Therefore, temperatures of the drive motors 105 and 125 may be monitored to execute torque limitation.

In FIG. 5, D, which is a minimum torque value irrelevant to a temperature of the drive motor, may be, for example, 0%, may vary according to capacity of the MOP 200, and may be selected by a test. A load corresponding to the D may be a load that does not require an additional cooling. In FIG. 5, E, F, and Y % that is a value between a torque corresponding to the E and a torque corresponding to the F may be selected by a test. A torque between the E and the F may have a linear slope or a non-linear slope.

Figure 6:
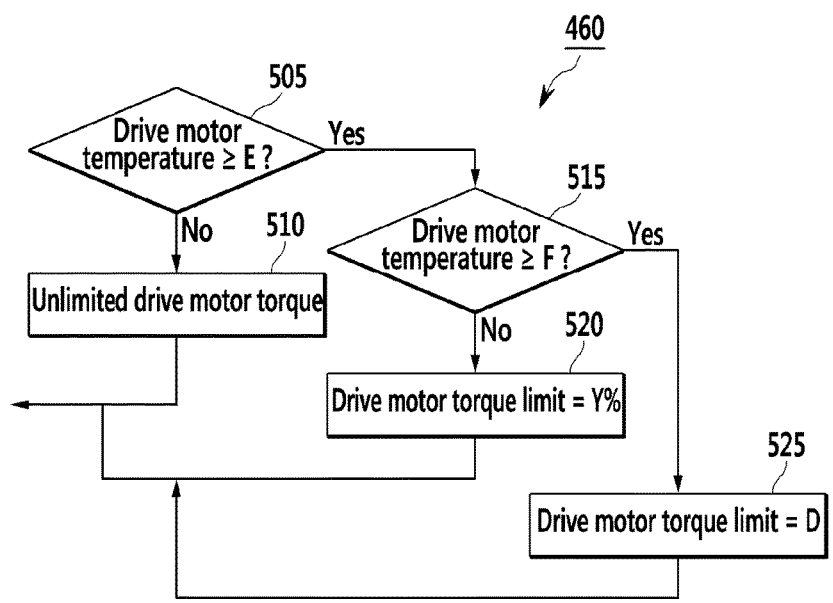
FIG. 6 is a flowchart describing the logic for limiting the torque of the drive motor shown in FIG. 3 according to an exemplary embodiment of the present invention.

FIG. 6 is a flowchart describing the logic for limiting the torque of the drive motor shown in FIG. 3. Referring to FIG. 6, in a determination step 505, the controller may be configured to determine whether a temperature of the drive motor 105 or 125 is greater than or equal to the E that is a threshold value. In response to determining that the temperature of the drive motor 105 or 125 is less than E, the process may proceed to a step 510. In response to determining that the temperature of the drive motor 105 or 125 is greater than or equal to E, the process may proceed to a determination step 515.

According to the determination step 515, the controller may be configured to determine whether the temperature of the drive motor is greater than or equal to F that is a threshold value. In response to determining that the temperature of the drive motor is less than F, the process may proceed to a limitation step 520. In response to determining that the temperature of the drive motor is greater than or equal to F, the process may proceed to a limitation step 525. According to the limitation step 520, the controller may be configured to drive the drive motor by limiting a torque of the drive motor to the Y %. According to the limitation step 525, the controller may be configured to drive the drive motor by limiting a torque of the drive motor to the D %.

Referring to FIG. 3, in a comparison step 465, the controller may be configured to determine whether a torque required by a driver is greater than or equal to the drive motor torque. The driver request torque may be detected by an acceleration pedal position sensor mounted within the hybrid vehicle. In response to determining that the driver request torque is greater than or equal to the drive motor torque, the process may proceed to step 470. In response to determining that the driver request torque is less than the drive motor torque, the process may proceed to a driving step 475. A torque required for driving the vehicle may be determined using the following equation.

The torque required for driving the vehicle=the engine torque+the drive motor torque When the driver request torque is greater than or equal to the drive motor torque, the engine 130 may be turned on and thus, a torque required for the HEV mode may be satisfied. Accordingly, limp home driving of the vehicle may be possible in a high-torque load region. Further, according to the driving step 475, the controller may be configured to enable limp home driving of the hybrid vehicle by driving the MOP 200. When the engine 130 that drives the hybrid vehicle is turned on, the controller may be configured to drive the MOP 200 that operates the transmission which is driven by the engine and the drive motor and thus, the controller may be configured to enable limp home mode drive of the hybrid vehicle. The limp home mode may correspond to a minimum drive state.

An exemplary embodiment of the limp home mode drive method may be described as follows. When a failure (e.g., a wire disconnection) of the EOP 300 or an impossibility of operating the EOP occurs while the hybrid vehicle is being driven, a first exemplary embodiment may include operating only the MOP 200 to supply a hydraulic pressure to the transmission, thereby enabling limp home mode drive of the vehicle. When a failure of the EOP 300 occurs while the hybrid vehicle is being driven, a second exemplary embodiment may include operating only the MOP 200 to supply a hydraulic pressure to the transmission, thereby enabling limp home mode drive of the vehicle. When the vehicle stops to wait for a light to change (e.g., a traffic light to allow the vehicle to continue driving) after the limp home mode drive, the second exemplary embodiment may include turning off the engine 130.

When a failure of the EOP 300 occurs while the hybrid vehicle is being driven, a third exemplary embodiment may include operating only the MOP 200 to supply a hydraulic pressure to the transmission, thereby enabling limp home mode drive of the vehicle. When the vehicle stops to wait for a light to change after the limp home mode drive, the third exemplary embodiment may include turning off the engine 130. Further, when charge of the battery is required after the engine is turned off, the third exemplary embodiment may include generating the warning. After the warning is generated, the limp home mode may be enabled and the engine 130 may be turned on to charge the battery.

When a failure of the EOP 300 occurs while the hybrid vehicle is being driven, a fourth exemplary embodiment may include operating only the MOP 200 to supply a hydraulic pressure to the transmission, thereby enabling limp home mode drive of the vehicle. When high load operation such as rapid acceleration or uphill driving is requested, the fourth exemplary embodiment may include turning on the engine. When the engine is turned on, high torque may be output and the vehicle may be driven in a region with the vehicle speed limitation.

According to a fifth exemplary embodiment, when a failure of the EOP 300 occurs as the hybrid vehicle is being decelerated, the engine 130 may be turned off. The exemplary embodiment of the present invention may not perform an operation of the OD brake due to the EOP failure and thus, the exemplary embodiment may include enabling the limp home driving in a mode except the parallel mode among modes of the FHS transmission.

The exemplary embodiments of the present invention may use only the MOP to perform lubrication for the transmission and cooling of the motors and may perform limp home driving by limiting the vehicle speed and the drive motor torque. As described above, the exemplary embodiment of the present invention may be a fail-safe logic (a fail-safe control method) that enables limp home driving when the vehicle is not capable of being driven (e.g., when the EOP for operating the FHS transmission fails or when it is impossible to operate the EOP due to the relay failure or the wiring failure).

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

105: first motor
110: overdrive brake
115: one way clutch
120: planetary gear set
125: second motor
130: engine
135: power output unit
200: MOP
300: EOP

What is claimed is:

1. A limp home mode drive method for a hybrid vehicle, comprising:
   prohibiting, by a controller, an operation of an overdrive brake that is included in a transmission for the hybrid vehicle when the hybrid vehicle is being driven and an electric oil pump is not operated;
   limiting, by the controller, a speed of the hybrid vehicle based on a heat value of a rotation driver included in the transmission;
   limiting, by the controller, a torque of a drive motor driving the transmission based on a temperature of the drive motor; and
   driving, by the controller, a mechanical oil pump included in the hybrid vehicle to enable limp home driving of the hybrid vehicle.

2. The limp home mode drive method of claim 1, further comprising:
   determining, by the controller, whether a torque required by a driver is greater than or equal to a torque of the drive motor,
   wherein in response to determining that the torque required by the driver is greater than or equal to the torque of the drive motor, the method includes driving the mechanical oil pump that operates the transmission driven by an engine and the drive motor to perform limp home driving of the hybrid vehicle after the engine that drives the transmission is turned on.

3. The limp home mode drive method of claim 1, wherein the rotation driver includes a gear.

4. The limp home mode drive method of claim 1, further comprising:
   determining, by the controller, whether the hybrid vehicle is being driven; and
   turning off, by the controller, an engine that drives the transmission in response to determining that the hybrid vehicle is not being driven.

5. The limp home mode drive method of claim 4, further comprising:
   determining, by the controller, whether charge of a battery mounted within the hybrid vehicle is required after the engine is turned off; and
   turning on, by the controller, a warning light in response to determining that the charge of the battery is required.

6. The limp home mode drive method of claim 1, wherein when the heat value of the rotation driver is greater than a predetermined heat value, a speed of the hybrid vehicle is less than a predetermined speed value.

7. The limp home mode drive method of claim 1, wherein when the temperature of the drive motor is greater than a predetermined temperature, the torque of the drive motor is less than a predetermined torque value.

8. A limp home mode drive system for a hybrid vehicle, comprising:
- a memory configured to store program instructions; and
- a processor configured to execute the program instructions, the program instructions when executed configured to:
  - prohibit an operation of an overdrive brake that is included in a transmission for the hybrid vehicle when the hybrid vehicle is being driven and an electric oil pump is not operated;
  - limit a speed of the hybrid vehicle based on a heat value of a rotation driver included in the transmission;
  - limit a torque of a drive motor driving the transmission based on a temperature of the drive motor; and
  - drive a mechanical oil pump included in the hybrid vehicle to enable limp home driving of the hybrid vehicle.

9. The limp home mode drive system of claim 8, wherein the program instructions when executed are further configured to:
- determine whether a torque required by a driver is greater than or equal to a torque of the drive motor,
- drive the mechanical oil pump that operates the transmission driven by an engine and the drive motor to perform limp home driving of the hybrid vehicle after the engine that drives the transmission is turned on in response to determining that the torque required by the driver is greater than or equal to the torque of the drive motor.

10. The limp home mode drive system of claim 8, wherein the rotation driver includes a gear.

11. The limp home mode drive system of claim 8, wherein the program instructions when executed are further configured to:
- determine whether the hybrid vehicle is being driven,
- turn off an engine that drives the transmission in response to determining that the hybrid vehicle is not being driven.

12. The limp home mode drive system of claim 11, wherein the program instructions when executed are further configured to:
- determine whether charge of a battery mounted within the hybrid vehicle is required after the engine is turned off; and
- turn on a warning light in response to determining that the charge of the battery is required.

13. The limp home mode drive system of claim 8, wherein when the heat value of the rotation driver is greater than a predetermined heat value, a speed of the hybrid vehicle is less than a predetermined speed value.

14. The limp home mode drive system of claim 8, wherein when the temperature of the drive motor is greater than a predetermined temperature, the torque of the drive motor is less than a predetermined torque value.

* * * * *